(12) United States Patent
Matsuo

(10) Patent No.: US 10,742,839 B2
(45) Date of Patent: Aug. 11, 2020

(54) IMAGE FORMING APPARATUS, METHOD OF CREATING GAMMA CORRECTION TABLE, AND IMAGE FORMING SYSTEM

(71) Applicant: KYOCERA Document Solutions Inc., Osaka (JP)

(72) Inventor: Masaru Matsuo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/411,174

(22) Filed: May 14, 2019

(65) Prior Publication Data

US 2019/0356816 A1 Nov. 21, 2019

(30) Foreign Application Priority Data

May 15, 2018 (JP) .................................. 2018-093832

(51) Int. Cl.
*H04N 1/407* (2006.01)

(52) U.S. Cl.
CPC ..... *H04N 1/407* (2013.01); *H04N 2201/0094* (2013.01)

(58) Field of Classification Search
CPC .......... H04N 1/407; H04N 2201/0094; H04N 1/6033; H04N 1/6055
See application file for complete search history.

(56) References Cited

U.S. PATENT DOCUMENTS

| | | | |
|---|---|---|---|
| 7,061,648 B2 | 6/2006 | Nakajima et al. | |
| 7,595,906 B2 | 9/2009 | Nakajima et al. | |
| 2002/0113984 A1 | 8/2002 | Nakajima et al. | |
| 2007/0182996 A1 | 8/2007 | Nakajima | |
| 2015/0098095 A1* | 4/2015 | Zaima | H04N 1/6005 358/1.2 |
| 2015/0371116 A1* | 12/2015 | Tanigawa | G06K 15/027 358/1.14 |

* cited by examiner

*Primary Examiner* — Christopher Wait
(74) *Attorney, Agent, or Firm* — Studebaker & Brackett PC

(57) ABSTRACT

An image forming apparatus includes an image forming unit, an acquisition unit, and a control unit. The image forming unit forms an image on a sheet based on a gamma correction table. The acquisition unit acquires information on a sheet. The control unit controls the image forming unit. The image forming unit forms a first image indicating first image data on a sheet. The acquisition unit acquires the information on the sheet from the first image. The control unit creates second image data for creating a gamma correction table based on the information on the sheet.

10 Claims, 4 Drawing Sheets

IMAGE FORMING APPARATUS, METHOD OF CREATING GAMMA CORRECTION TABLE, AND IMAGE FORMING SYSTEM

INCORPORATION BY REFERENCE

The present application claims priority under 35 U.S.C. § 119 to Japanese Patent Application No. 2018-093832, filed on May 15, 2018, the entire contents of which are incorporated herein by reference.

BACKGROUND

The present disclosure relates to an image forming apparatus and a method of creating a gamma correction table.

There has been provided an image forming apparatus that performs gamma correction processing to improve color reproducibility of an output image. An image forming apparatus includes an image forming unit and a measuring unit. The image forming unit forms a patch pattern on a sheet. The measuring unit measures the density of the patch pattern. The image forming apparatus updates a gamma correction table based on the measurement result of the measuring unit. The image forming apparatus can adjust output characteristics by updating the gamma correction table.

SUMMARY

An image forming apparatus according to an aspect of the present disclosure includes an image forming unit, an acquisition unit, and a control unit. The image forming unit forms an image on a sheet based on a gamma correction table. The acquisition unit acquires information on the sheet. The control unit controls the image forming unit. The image forming unit forms, on a sheet, a first image indicating first image data including the information on the sheet. The acquisition unit acquires the information on the sheet from the first image. The control unit creates second image data based on the information on the sheet acquired by the acquisition unit. The second image data is image data for creating the gamma correction table.

A method of creating a gamma correction table of an image forming apparatus according to an aspect of the present disclosure includes a forming step, an acquisition step, and a creation step. In the forming step, a first image indicating first image data including information on a sheet is formed on the sheet. In the acquisition step, the information on the sheet is acquired from the first image. In the creation step, a gamma correction table is created based on the information on the sheet acquired in the acquisition step. The second image data is image data for creating the gamma correction table.

DETAILED DESCRIPTION

Hereinafter, embodiments of the present disclosure will be described with reference to the accompanying drawings. Note that in the figures, the same or corresponding parts are denoted by the same reference signs, and a description of such parts is not repeated.

Figure 1:
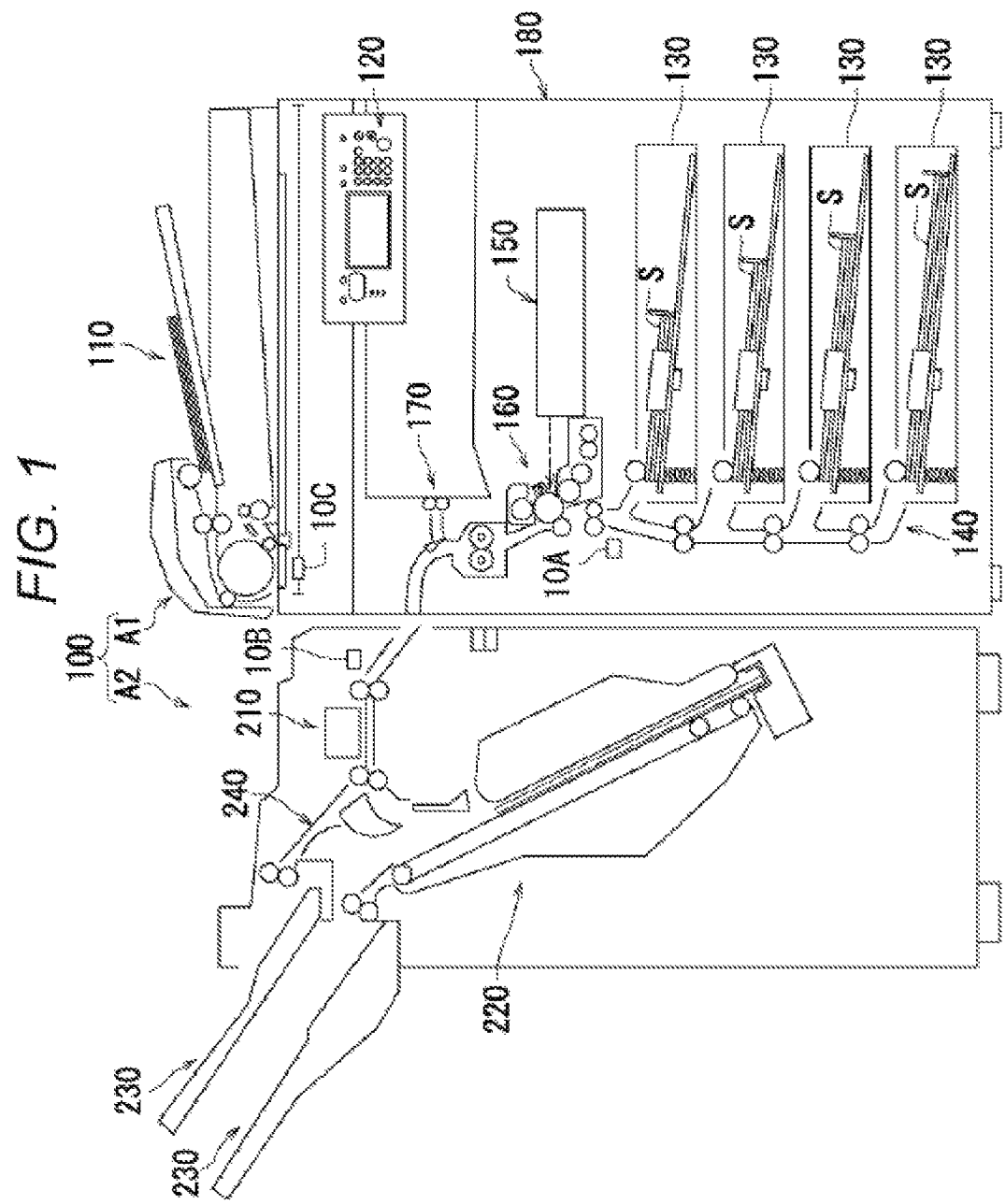
FIG. 1 is a diagram showing an image forming system according to an embodiment of the present disclosure.

An image forming system 100 according to an embodiment of the present disclosure will be described with reference to FIG. 1. FIG. 1 is a schematic cross-sectional diagram of the image forming system 100. In the embodiment, the image forming system 100 is a multifunction peripheral.

As shown in FIG. 1, the image forming system 100 includes an image forming apparatus A1 and a postprocessing apparatus A2.

The image forming apparatus A1 includes a reading unit 110, an operation unit 120, a sheet storage unit 130, a document conveyance device 140, a replenishment unit 150, an image forming unit 160, a discharge device 170, and a housing 180. The sheet storage unit 130, the document conveyance device 140, the replenishment unit 150, the image forming unit 160, and the discharge device 170 are accommodated inside the housing 180.

The reading unit 110 reads an image formed on a sheet S. The reading unit 110 is a scanner for acquiring information on the sheet S. The reading unit 110 includes a contact glass, a platen cover, a light emitting unit, and an image sensor 10C. The sheet S is placed on the contact glass. The platen cover covers the contact glass. The light emitting unit is a light emitting diode (LED), for example. The image sensor 10C acquires information on the sheet S from the image. The image sensor 10 is an example of an "acquisition unit". Information on the sheet S is information indicating characteristics of the sheet S. Information indicating characteristics of the sheet S is information including at least one of the brand of the sheet S, the color of the sheet S, the surface characteristics of the sheet S, the basis weight of the sheet S, the thickness of the sheet S, and the type of the sheet S, for example. The surface characteristics of the sheet S indicate whether the surface of the sheet S is rough or smooth, for example.

The image sensor 10C is a charge coupled device (CCD), for example. The CCD reciprocates along the contact glass on which the sheet S is placed. The CCD scans the image formed on the sheet S. The CCD also acquires the density of the sheet S from the sheet S. The information on the sheet S and the density of the sheet S acquired by the CCD are output to a control unit 20.

The operation unit 120 receives an instruction for the image forming apparatus A1 from a user. The operation unit 120 that has received the instruction from the user outputs a signal indicating the instruction from the user. When the operation unit 120 receives information, it indicates that the information is input to the image forming apparatus A1 through the operation unit 120.

The operation unit 120 includes a touch panel and multiple operation keys. The touch panel includes a display unit and a touch sensor. The display unit displays various screens. The various screens include a standby screen. The standby screen includes a menu button for instructing execution of various processing, for example. The display unit is a liquid crystal display unit or an organic electroluminescence display (organic EL display) unit, for example.

The sheet storage unit 130 stores multiple sheets S. The sheet storage unit 130 delivers the stored multiple sheets S one by one. Multiple sheet storage units 130 are provided in the image forming apparatus A1. Different types of sheets S are stored in the multiple sheet storage units 130. The sheet S is plain paper, copy paper, recycled paper, thin paper, thick paper, glossy paper, or an overhead projector (OHP) sheet, for example.

The document conveyance device 140 conveys the sheet S sent from the sheet storage unit 130 to the discharge device 170. The document conveyance device 140 includes a sheet feeding unit and a sheet conveyance unit. The sheet feeding unit feeds the sheet S to the sheet conveyance unit. The sheet feeding unit is disposed downstream of the sheet storage unit 130. The sheet conveyance unit has multiple roller pairs disposed along a conveyance path. Each of the roller pairs has a drive roller and a driven roller. The drive roller is coupled to a drive source such as a motor through a rotating shaft or the like. The driven roller is in pressure contact with the drive roller. The driven roller is rotated by a frictional force between the driven roller and the drive roller. Further, the driven roller is rotated by being driven by the drive roller through the sheet S.

The document conveyance device 140 includes an image sensor 10A. The image sensor 10A acquires information on the sheet S. The image sensor 10A is a contact image sensor (CIS). The CIS is provided in the conveyance path. The CIS is used at a fixed position. The CIS also acquires the density from the sheet S. The information on the sheet S and the density of the sheet S acquired by the CIS are output to the control unit 20.

The replenishment unit 150 replenishes the image forming unit 160 with toner.

The image forming unit 160 consumes toner and forms an image on the sheet S. Here, an image refers to a toner image. The image forming unit 160 forms an image on the sheet S based on a gamma correction table.

The image forming unit 160 includes a photosensitive drum, a developing device, a charger, a cleaner, a transfer roller, and an exposure device.

The charger charges a peripheral surface of the photosensitive drum. The exposure device irradiates the peripheral surface of the photosensitive drum, which is charged by the charger, with laser light. Laser light is generated based on image data. As a result, an electrostatic latent image conforming to the image data is formed on the peripheral surface of the photosensitive drum.

The developing device supplies toner to the peripheral surface of the photosensitive drum bearing the electrostatic latent image formed thereon. The toner supplied from the developing device to the photosensitive drum develops the electrostatic latent image formed on the peripheral surface of the photosensitive drum. As a result, an image using toner is formed on the peripheral surface of the photosensitive drum.

The photosensitive drum is in contact with a peripheral surface of the transfer roller. When the sheet S passes between the photosensitive drum and the transfer roller, the image carried by the photosensitive drum is transferred to the sheet S. The cleaner removes residual toner from the peripheral surface of the photosensitive drum after the image is transferred to the sheet S.

The discharge device 170 discharges the sheet S, on which the toner image has been fixed, from the inside of the housing 180 to a discharge tray through a sheet discharge port.

Next, the postprocessing apparatus A2 will be described. The postprocessing apparatus A2 receives the sheet S on which the image has been formed by the image forming apparatus A1. The postprocessing apparatus A2 includes a punch processing unit 210, a staple processing unit 220, a discharge device 230, and a document conveyance device 240.

The punch processing unit 210 includes a punching unit. The punch processing unit 210 is disposed upstream of the postprocessing apparatus A2. The punching unit punches the sheet S conveyed from the image forming apparatus A1.

The staple processing unit 220 includes a stapling unit and a processing tray. The staple processing unit 220 is disposed downstream of the postprocessing apparatus A2. The stapling unit staples a sheaf of sheets S stacked on the processing tray. The sheaf of sheets S is a sheaf of multiple sheets S.

The discharge device 230 discharges the sheet S punched by the punch processing unit 210, from the inside of the postprocessing apparatus A2 to a discharge tray through a sheet discharge port. The discharge device 230 also discharges the sheet S stapled by the staple processing unit 220, from the inside of the postprocessing apparatus A2 to a discharge tray through a sheet discharge port.

The document conveyance device 240 conveys the sheet S sent from the image forming apparatus A1 to the discharge device 230. The document conveyance device 240 includes a sheet feeding unit and a sheet conveyance unit. The sheet feeding unit feeds the sheet S to the sheet conveyance unit. The sheet conveyance unit has multiple roller pairs disposed along a conveyance path. Each of the roller pairs has a drive roller and a driven roller.

The document conveyance device 240 also includes an image sensor 10B. The image sensor 10B acquires information on the sheet S. The image sensor 10B is a contact image sensor (CIS). The CIS is provided in the conveyance path. The CIS is used at a fixed position. The CIS also acquires the density from the sheet S. The information on the sheet S and the density of the sheet S acquired by the CIS are output to the control unit 20.

Figure 2:
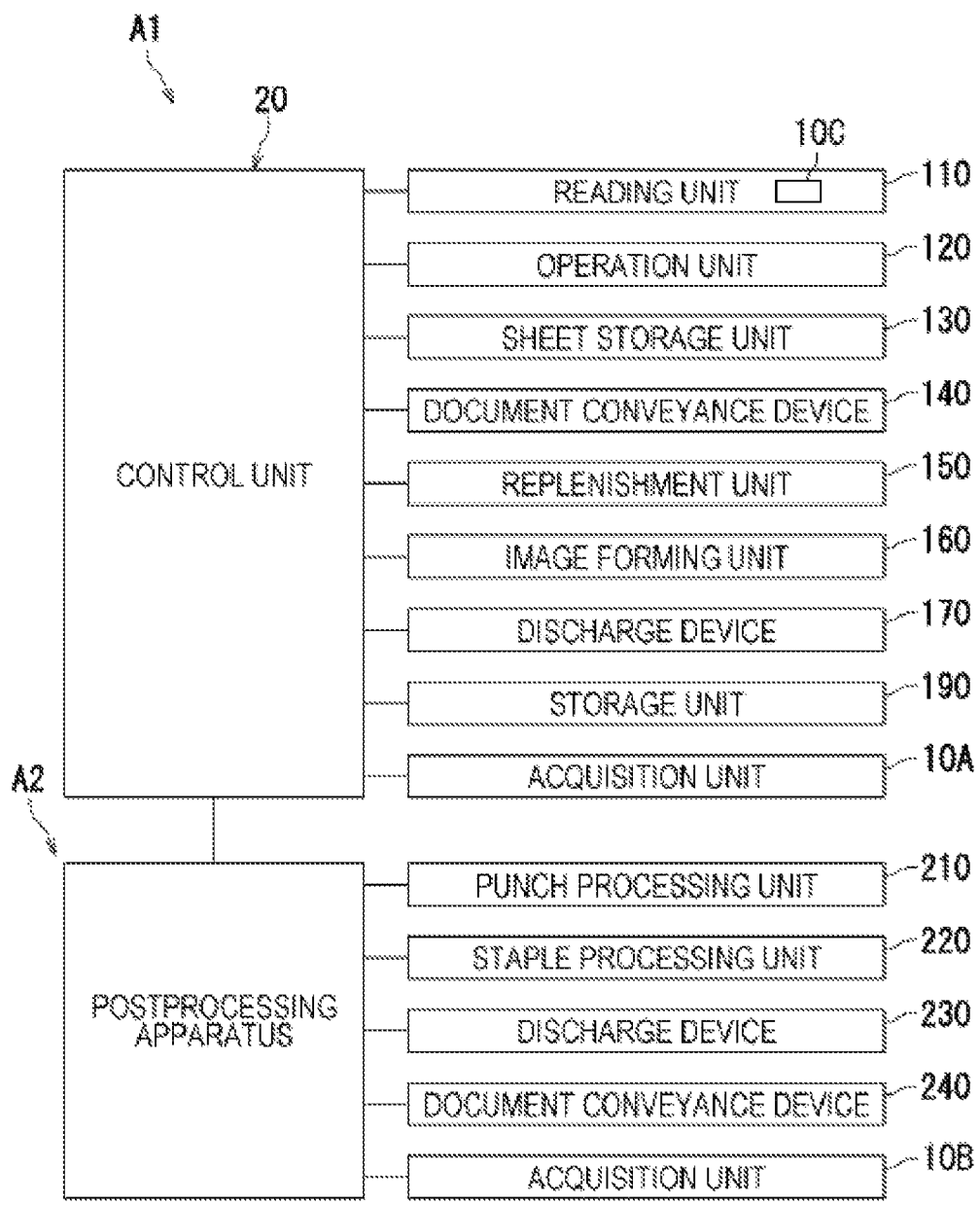
FIG. 2 is a block diagram showing the image forming system according to the embodiment of the present disclosure.

Next, the image forming system 100 will be further described with reference to FIG. 2. FIG. 2 is a block diagram showing the image forming system 100.

As shown in FIG. 2, the image forming apparatus A1 further includes a storage unit 190 and the control unit 20.

The storage unit 190 includes a storage device. The storage device includes a main storage device such as a read only memory (ROM) and a random access memory (RAM), and may further include an auxiliary storage device (e.g., hard disk drive and non-volatile memory). The main storage device is a semiconductor memory, for example. The auxiliary storage devices are a hard disk drive and a non-volatile memory, for example. The main storage device and/or the auxiliary storage device store various computer programs to be executed by the control unit 20. The computer program includes a program that performs calibration processing.

The storage unit 190 also stores a gamma correction table and first image data. The gamma correction table is used to correct input-output characteristics of the image forming apparatus A1. The storage unit 190 also stores a gamma correction table for each type of sheet S. The first image data is information on the sheet S. The first image data is provided from the seller of the sheet S. Also, the first image data may include information indicating a patch pattern for performing the calibration processing.

The control unit 20 includes processors such as a central processing unit (CPU) and a micro processing unit (MPU). The control unit 20 controls each element of the image forming apparatus A1. Specifically, the processor of the control unit 20 executes the computer program stored in the storage device to control the reading unit 110, the operation unit 120, the document conveyance device 140, the replenishment unit 150, the image forming unit 160, the discharge device 170, and the storage unit 190.

The processor of the control unit 20 controls the postprocessing apparatus A2 by executing a computer program stored in the storage device. Specifically, the processor of the control unit 20 executes a computer program stored in the storage device to control the punch processing unit 210, the staple processing unit 220, the discharge device 230, and the document conveyance device 240.

Figure 3:
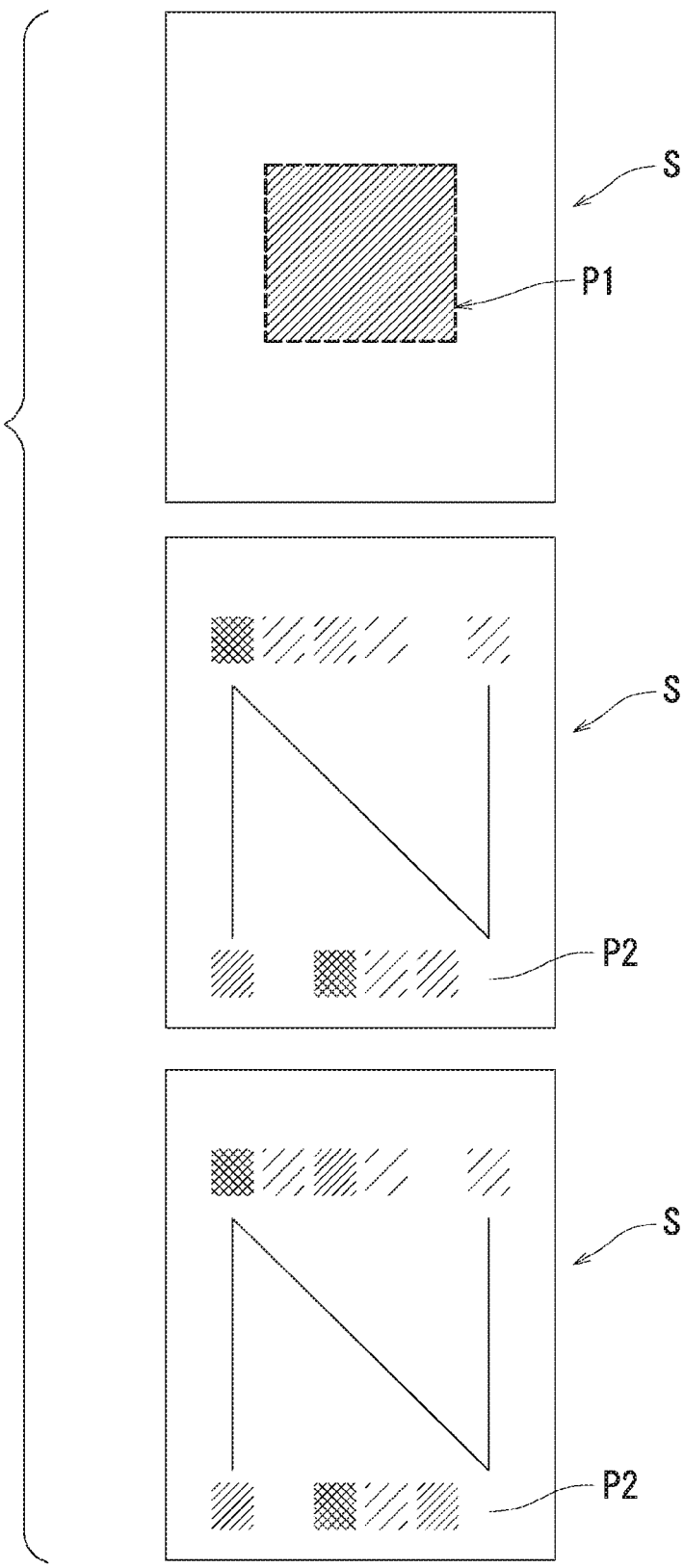
FIG. 3 is a view showing sheets on which an image is formed.

Next, the sheet S on which an image indicating first image data is formed and the sheet S on which an image indicating second image data is formed will be described with reference to FIG. 3. FIG. 3 is a view showing the sheets S on which an image is formed. A first image P1 indicating the first image data is formed on the first sheet S. A second image P2 indicating the second image data is formed on the second sheet S. A second image P2 indicating the second image data is formed on the third sheet S.

The control unit 20 acquires, from the storage unit 190, the first image data corresponding to the sheet S designated by the user. The control unit 20 controls the image forming unit 160, so that the image forming unit 160 forms the first image P1 on the sheet S based on the first image data. The first image P1 is a rectangular image. The first image P1 includes an image showing the brand of the sheet S, an image showing the color of the sheet S, an image showing the surface characteristics of the sheet S, an image showing the thickness of the sheet S, and an image showing the type of the sheet S, for example. That is, the first image P1 includes information on the sheet S. Accordingly, the image forming unit 160 forms, on the sheet S, the first image P1 indicating the first image data including information on the sheet S. The first image P1 is a QR code (registered trademark), for example.

The first image P1 formed on the sheet S is read by the reading unit 110. Specifically, the image sensor 10C acquires the information on the sheet S from the first image P1. The image sensor 10C outputs the acquired information on the sheet S to the control unit 20. As a result, the image forming apparatus A1 can acquire the information on the sheet S.

The control unit 20 creates the second image data based on the first image data acquired by the image sensor 10C. Specifically, the control unit 20 creates the second image data based on the information on the sheet S included in the first image P1 acquired by the image sensor 10C. The second image data is image data for creating a gamma correction table. The image data for creating a gamma correction table is image data indicating a patch pattern suitable for the sheet S. The image sensor 10C acquires the information on the sheet S from the first image P1, whereby the second image data is created. Hence, the second image data is created without requiring the user to input the information on the sheet S. As a result, it is more convenient for the user to create the gamma correction table.

The control unit 20 controls the image forming unit 160, so that the image forming unit 160 forms the second image P2 indicating the second image data. The second image P2 is a rectangular image as shown in FIG. 3. The second images P2 may be arranged in a random order, or may be arranged so that the density changes stepwise according to the number of gradations.

The second image P2 formed on the sheet S is read by the reading unit 110. Specifically, the image sensor 10C acquires the density of the second image P2 formed on the sheet S. More specifically, the image sensor 10C acquires the density of the patch pattern formed on the sheet S. The control unit 20 converts the density of the patch pattern acquired by the image sensor 10C into a density value.

The control unit 20 also creates a gamma correction table based on the density of the second image P2 acquired by the image sensor 10C. Specifically, the control unit 20 performs calibration processing. The calibration processing is processing of updating the gamma correction table and creating a gamma correction table suitable for the sheet S. In the gamma correction table, target output density values are indicated for each gradation so that an image may be formed with preset density values. The gamma correction table suitable for the sheet S is created by changing the input density value of the gamma correction table. Note that the target output density value is set at the time of factory shipment. The target output density value is stored in the storage unit 190.

The control unit 20 changes the input density value based on the density value of the second image P2 and the target output density value. Specifically, the control unit 20 changes the input density value to a value close to or same as the target output density value. Note that the input density value is changed for each gradation. As a result, the control unit 20 can create a gamma correction table suitable for the sheet S. The first image data and the gamma correction table created based on the density value of the second image P2 are stored in the storage unit 190. As a result, the gamma correction table can be created in accordance with the information on the sheet S. The image sensor 10C acquires the information on the sheet S from the first image P1, whereby the second image data is created. Furthermore, since the second image P2 is formed on the sheet S based on the second image data, the user is not required to input the information on the sheet S. As a result, it is more convenient for the user to input the information on the sheet S.

In addition, since the second image P2 is created in accordance with the information on the sheet S, the number of patch patterns varies. Hence, the number of patch patterns increases or decreases. When there are many patch patterns, the image sensor 10C acquires a large amount of information. This enhances accuracy of the calibration processing. When there are less patch patterns, on the other hand, the calibration processing is completed quickly. Hence, the user is not kept waiting, and convenience for the user is improved.

Figure 4:
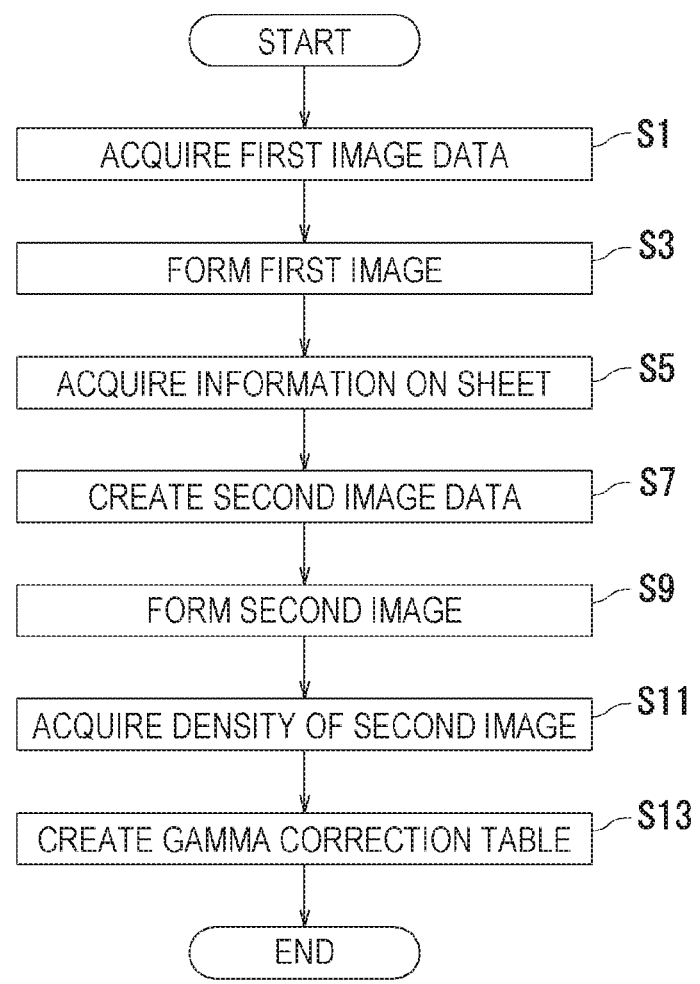
FIG. 4 is a flowchart showing calibration processing of an image forming apparatus.

Next, the calibration processing of the image forming apparatus A1 will be described with reference to FIG. 4. FIG. 4 is a flowchart showing the calibration processing of the image forming apparatus A1. The calibration processing of the image forming apparatus A1 includes steps S1 to S13. As shown in FIG. 4, the gamma correction table suitable for the sheet S is created through the processing of steps S1 to S13.

In step S1, the control unit 20 acquires, from the storage unit 190, the first image data corresponding to the sheet S designated by the user. The processing proceeds to step S3.

In step S3, the control unit 20 controls the image forming unit 160, so that the image forming unit 160 forms the first image P1 indicating the first image data. The processing proceeds to step S5.

In step S5, the control unit 20 controls the image sensor 10C, so that the image sensor 10C acquires information on the sheet S from the first image P1. The information on the sheet S acquired by the image sensor 10C is output to the control unit 20. The processing proceeds to step S7.

In step S7, the control unit 20 creates the second image data based on the information on the sheet S acquired by the image sensor 10C. The processing proceeds to step S9.

In step S9, the control unit 20 controls the image forming unit 160, so that the image forming unit 160 forms the second image P2 indicating the second image data. The processing proceeds to step S11.

In step S11, the control unit 20 controls the image sensor 10C, so that the image sensor 10C acquires the density of the second image P2 from the second image P2. The density of the second image P2 acquired by the image sensor 10C is output to the control unit 20. The control unit 20 converts the density of the second image P2 into a density value. The processing proceeds to step S13.

In step S13, the control unit 20 creates a gamma correction table based on the density value of the second image P2. As a result, calibration processing can be performed in accordance with the characteristics of the sheet S.

The embodiment of the present disclosure has been described with reference to the drawings (FIGS. 1 to 4). Note, however, that the present disclosure is not limited to the embodiment described above but various alterations (for example, alterations (1) and (2) described below) may be made within the scope of the present disclosure. In addition, various disclosures can be formed by an appropriate combination of multiple components disclosed in the above-described embodiments. For example, some constituent elements may be deleted from among all the constituent elements shown in the embodiment. Further, constituent elements of different embodiments may be appropriately combined. The drawings are intended to emphasize the components in a schematic manner to assist understanding. The thickness, the length, and the number of the components illustrated, and also spaces therebetween, are not to scale for diagrammatic purposes. Furthermore, properties of constituent elements described in the above embodiment, such as speed, material, shape, and dimension, are merely examples and are not intended as specific limitations. Various alterations may be made as long as there is no substantial deviation from the configuration of the present disclosure.

(1) The first image data can also be acquired by the image forming apparatus A1. For example, the control unit 20 can determine the color of the sheet S based on information on the sheet S acquired by the image sensor 10A. The control unit 20 determines the color of the sheet S based on the distribution of density values of each pixel of the sheet S. When the color of the sheet S is white, the density values of each pixel are almost the same. Specifically, when the color of the sheet S is white, the density value of red, the density value of green, and the density value of blue of each pixel are substantially the same. As a result, the control unit 20 can determine the color of the sheet S based on the density value of each pixel of the sheet S. The control unit 20 also controls the storage unit 190, so that the storage unit 190 stores the determination result as the first image data.

The control unit 20 can also determine the surface characteristic of the sheet S based on the information on the sheet S acquired by the image sensor 10A. For example, the control unit 20 determines the surface characteristic of the sheet S based on the distribution of density values of each pixel of the sheet S. When the surface of the sheet S is rough, the distribution width of density values is large. When the surface of the sheet S is smooth, the distribution width of density values is small. Accordingly, the control unit 20 can determine the surface characteristics of the sheet S based on the distribution of density values. The control unit 20 controls the storage unit 190, so that the storage unit 190 stores the determination result as the first image data.

In addition, the control unit 20 can determine the thickness of the sheet S based on the information on the sheet S acquired by the image sensor 10C. For example, the control unit 20 determines the thickness of the sheet S based on pixels having a small density value included near an end of the sheet S. When the sheet S is positioned between the contact glass and the platen cover of the reading unit 110, a gap is generated between the contact glass and the platen cover. When the sheet S is thick, the gap is large. When the sheet S is thin, the gap is small. That is, when the sheet S is thick, there are more pixels having a small density value. When the sheet S is thin, there are less pixels having a small density value. As a result, the control unit 20 can determine the thickness of the sheet S based on the number of pixels having a small density value. Since the control unit 20 can determine the thickness of the sheet S, the control unit 20 can determine the mass of the sheet S. The mass of the sheet S is also called basis weight. The control unit 20 controls the storage unit 190, so that the storage unit 190 stores the determination result as the first image data.

In addition, the control unit 20 can determine the type of the sheet S based on the information on the sheet S acquired by the image sensor 10A. When determining the type of the sheet S from the acquired information on the sheet S, the control unit 20 determines the type of the sheet S based on the acquired information on the sheet S and the information on the sheet S stored in the storage unit 190, for example. By determining the type of the sheet S, the control unit 20 can determine whether the sheet S is plain paper, copy paper, recycled paper, thin paper, thick paper, glossy paper, or an OHP sheet. The control unit 20 controls the storage unit 190, so that the storage unit 190 stores the determination result as the first image data.

The control unit 20 can acquire information related to the first image data from the sheet S, which is effective when the first image data cannot be acquired from the seller. As a result, it is possible to create a gamma correction table appropriate for the information on the sheet S.

(2) Information on the sheet S of the first image P1 and the density of the second image P2 may be acquired by the image sensor 10B of the postprocessing apparatus A2. When the image sensor 10B of the postprocessing apparatus A2 acquires the information on the sheet S of the first image P1, the sheet S on which the first image P1 is formed is conveyed to the postprocessing apparatus A2. The information on the sheet S is acquired from the first image P1 of the conveyed sheet S by the image sensor 10B of the postprocessing apparatus A2. The control unit 20 creates the second image data based on the acquired information on the sheet S. The control unit 20 controls the image forming unit 160, so that the image forming unit 160 forms the second image P2 indicating the second image data on the sheet S. The sheet S on which the second image P2 is formed is conveyed to the postprocessing apparatus A2. The density of the second image P2 of the conveyed sheet S is acquired by the image sensor 10B of the postprocessing apparatus A2. The control unit 20 creates a gamma correction table based on the acquired density of the second image P2. As a result, it is possible to omit the process of setting the sheet S on which the first image P1 is formed in the reading unit 110 and causing the image forming apparatus A1 to acquire the information on the sheet S of the first image P1. It is also possible to omit the process of setting the sheet S on which the second image P2 is formed in the reading unit 110 and causing the image forming apparatus A1 to acquire the density of the second image P2. As a result, convenience for the user is improved.

What is claimed is:
1. An image forming apparatus comprising:
a sheet storage unit that stores a sheet;
an image forming unit that forms an image on the sheet according to a gamma correction table;

a first acquisition unit that is disposed in a conveyance path between the sheet storage unit and the image forming unit and that acquires information on the sheet from the sheet conveyed in the conveyance path;

a storage unit that stores as first image data the information on the sheet acquired by the first acquisition unit;

a reading unit; and a control unit that controls the image forming unit, wherein the image forming unit forms, on the sheet, a first image based on the first image data stored in the storage unit, the reading unit acquires the information on the sheet by reading the first image formed on the sheet, the control unit creates second image data based on the information on the sheet acquired by the reading unit, and the second image data is image data for creating a gamma correction table for the sheet.

2. The image forming apparatus according to claim 1, wherein the information on the sheet indicates at least one of a color of the sheet, a surface characteristic of the sheet, and a basis weight of the sheet.

3. The image forming apparatus according to claim 1, wherein the image forming unit forms a second image indicating the second image data on the sheet.

4. The image forming apparatus according to claim 3, wherein the reading unit acquires a density of the second image formed on the sheet by reading the second image formed on the sheet, and the control unit creates the gamma correction table based on the density of the second image acquired by the reading unit.

5. The image forming apparatus according to claim 4, wherein the storage unit further stores the gamma correction table created based on the density of the second image.

6. The image forming apparatus according to claim 1, wherein the control unit determines a color of the sheet based on the information on the sheet acquired by the first acquisition unit, and controls the storage unit so that the storage unit stores a result of determination by the control unit as the first image data.

7. The image forming apparatus according to claim 1, wherein the control unit determines a surface characteristic of the sheet based on the information on the sheet acquired by the first acquisition unit, and controls the storage unit so that the storage unit stores a result of determination by the control unit as the first image data.

8. The image forming apparatus according to claim 1, wherein the control unit determines a type of the sheet based on the information on the sheet acquired by the first acquisition unit, and controls the storage unit so that the storage unit stores a result of determination by the control unit as the first image data.

9. An image forming system comprising:

the image forming apparatus according to claim 1; and a postprocessing apparatus that receives the sheet from the image forming apparatus, wherein the postprocessing apparatus includes a second acquisition unit that acquires a density of the first image formed on the sheet, the second acquisition unit acquires the information on the sheet by reading the first image formed on the sheet, and the control unit creates second image data based on the information on the sheet acquired by the second acquisition unit.

10. A method of creating a gamma correction table of an image forming apparatus, the method comprising:

acquiring information on a sheet as first image data by a first acquisition unit disposed in a conveyance path between an image forming unit and a sheet storage unit of the image forming apparatus, the sheet storage unit storing the sheet, the sheet being conveyed in the conveyance path;

storing as first image data the information on the sheet acquired in the acquiring information on a sheet;

forming, on the sheet, a first image base on the first image data stored in the storing;

acquiring the information on the sheet by reading the first image formed on the sheet; and creating second image data based on the information on the sheet acquired in the acquiring the information on the sheet by reading the first image, wherein the second image data is image data for creating a gamma correction table for the sheet.

* * * * *